(12) United States Patent
Guard

(10) Patent No.: US 8,896,573 B1
(45) Date of Patent: Nov. 25, 2014

(54) LINE SPACING IN MESH DESIGNS FOR TOUCH SENSORS

(71) Applicant: David Brent Guard, Southampton (GB)

(72) Inventor: David Brent Guard, Southampton (GB)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 14/159,981

(22) Filed: Jan. 21, 2014

(51) Int. Cl.
*G06F 3/045* (2006.01)
*G06F 3/044* (2006.01)

(52) U.S. Cl.
CPC ...................................... *G06F 3/044* (2013.01)
USPC ......................................................... 345/174

(58) Field of Classification Search
CPC . G06F 3/044; G06F 2293/04112; H05K 9/00; H05K 9/0096
USPC ........ 345/156–184; 455/567, 550.1; 361/748; 178/18.01–18.06
See application file for complete search history.

(56) References Cited

U.S. PATENT DOCUMENTS

| 5,329,577 | A | * | 7/1994 | Norimatsu .................... 455/567 |
| 7,663,607 | B2 | | 2/2010 | Hotelling |
| 7,864,503 | B2 | | 1/2011 | Chang |
| 7,875,814 | B2 | | 1/2011 | Chen |
| 7,920,129 | B2 | | 4/2011 | Hotelling |
| 8,031,094 | B2 | | 10/2011 | Hotelling |
| 8,031,174 | B2 | | 10/2011 | Hamblin |
| 8,040,326 | B2 | | 10/2011 | Hotelling |
| 8,049,732 | B2 | | 11/2011 | Hotelling |
| 8,179,381 | B2 | | 5/2012 | Frey |
| 8,217,902 | B2 | | 7/2012 | Chang |
| 8,591,279 | B1 | | 11/2013 | Cok |
| 8,692,795 | B1 | * | 4/2014 | Kremin et al. ................ 345/174 |
| 8,692,802 | B1 | * | 4/2014 | Maharyta et al. ............. 345/174 |
| 8,736,571 | B1 | * | 5/2014 | Guard et al. ................... 345/173 |
| 2001/0035924 | A1 | | 11/2001 | Fujieda |
| 2008/0239356 | A1 | * | 10/2008 | Nakano ......................... 358/1.9 |
| 2008/0309635 | A1 | | 12/2008 | Matsuo |
| 2009/0315854 | A1 | | 12/2009 | Matsuo |
| 2010/0149117 | A1 | | 6/2010 | Chien et al. |
| 2011/0148781 | A1 | | 6/2011 | Chen et al. |
| 2011/0157102 | A1 | * | 6/2011 | Ando et al. ................... 345/184 |

(Continued)

FOREIGN PATENT DOCUMENTS

WO    WO 2012/129247 A2    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.

(Continued)

*Primary Examiner* — Prabodh M Dharia
(74) *Attorney, Agent, or Firm* — Baker Botts LLP

(57) ABSTRACT

An apparatus includes a touch sensor that includes a mesh of multiple first and second lines of conductive material extending across a display, where the display includes multiple pixels. The first lines are substantially parallel to each other, and the second lines are substantially parallel to each other. Each of the pixels has a first pixel pitch ($PP_x$) along a first axis and a second pixel pitch ($PP_y$) along a second axis that is perpendicular to the first axis. The first pixel pitch is equal to a distance between corresponding features of two adjacent pixels along the first axis, and the second pixel pitch is equal to a distance between corresponding features of two adjacent pixels along the second axis. The first and second lines extend across the display at first and second angles, respectively, relative to the first axis.

20 Claims, 8 Drawing Sheets

(56) References Cited

U.S. PATENT DOCUMENTS

| | | |
|---|---|---|
| 2011/0242028 A1* | 10/2011 | Lee et al. .................... 345/173 |
| 2011/0291966 A1 | 12/2011 | Takao et al. |
| 2012/0013546 A1* | 1/2012 | Westhues et al. ............ 345/173 |
| 2012/0044165 A1 | 2/2012 | Kwak et al. |
| 2012/0242588 A1 | 9/2012 | Myers |
| 2012/0242606 A1 | 9/2012 | Mackey |
| 2012/0243151 A1 | 9/2012 | Lynch |
| 2012/0243719 A1 | 9/2012 | Franklin |
| 2012/0262412 A1* | 10/2012 | Guard et al. ................. 345/174 |
| 2012/0313880 A1* | 12/2012 | Geaghan et al. ............. 345/173 |
| 2013/0076612 A1 | 3/2013 | Myers |
| 2013/0100054 A1* | 4/2013 | Philipp ........................ 345/173 |
| 2013/0127769 A1* | 5/2013 | Guard et al. ................. 345/174 |
| 2013/0155000 A1 | 6/2013 | Trend et al. |
| 2013/0234974 A1* | 9/2013 | Guard .......................... 345/174 |
| 2013/0294037 A1* | 11/2013 | Kuriki et al. ................. 361/748 |
| 2013/0341070 A1* | 12/2013 | Kim et al. .................... 174/250 |
| 2013/0342472 A1* | 12/2013 | Guard .......................... 345/173 |
| 2014/0152580 A1* | 6/2014 | Weaver et al. ............... 345/173 |
| 2014/0152613 A1* | 6/2014 | Ishizaki et al. .............. 345/174 |

OTHER PUBLICATIONS

U.S. Appl. No. 61/454,894, filed Mar. 21, 2011, Rothkopf.
U.S. Appl. No. 13/910,055, filed Jun. 4, 2013, Guard.
U.S. Appl. No. 14/031,372, filed Sep. 19, 2013, Guard.
Non-Final Office Action for U.S. Appl. No. 13/910,055, Sep. 10, 2013.
Response to Non-Final Office Action for U.S. Appl. No. 13/910,055, Dec. 10, 2013.
Notice of Allowance for U.S. Appl. No. 13/910,055, Jan. 14, 2014.
U.S. Appl. No. 14/248,096, filed Apr. 8, 2014, Guard.
U.S. Appl. No. 14/248,117, filed Apr. 8, 2014, Guard.
U.S. Appl. No. 14/183,876, filed Feb. 19, 2014, Guard.
U.S. Appl. No. 14/183,918, filed Feb. 19, 2014, Guard.

* cited by examiner

LINE SPACING IN MESH DESIGNS FOR TOUCH SENSORS

TECHNICAL FIELD

This disclosure generally relates to line spacing in mesh designs for touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
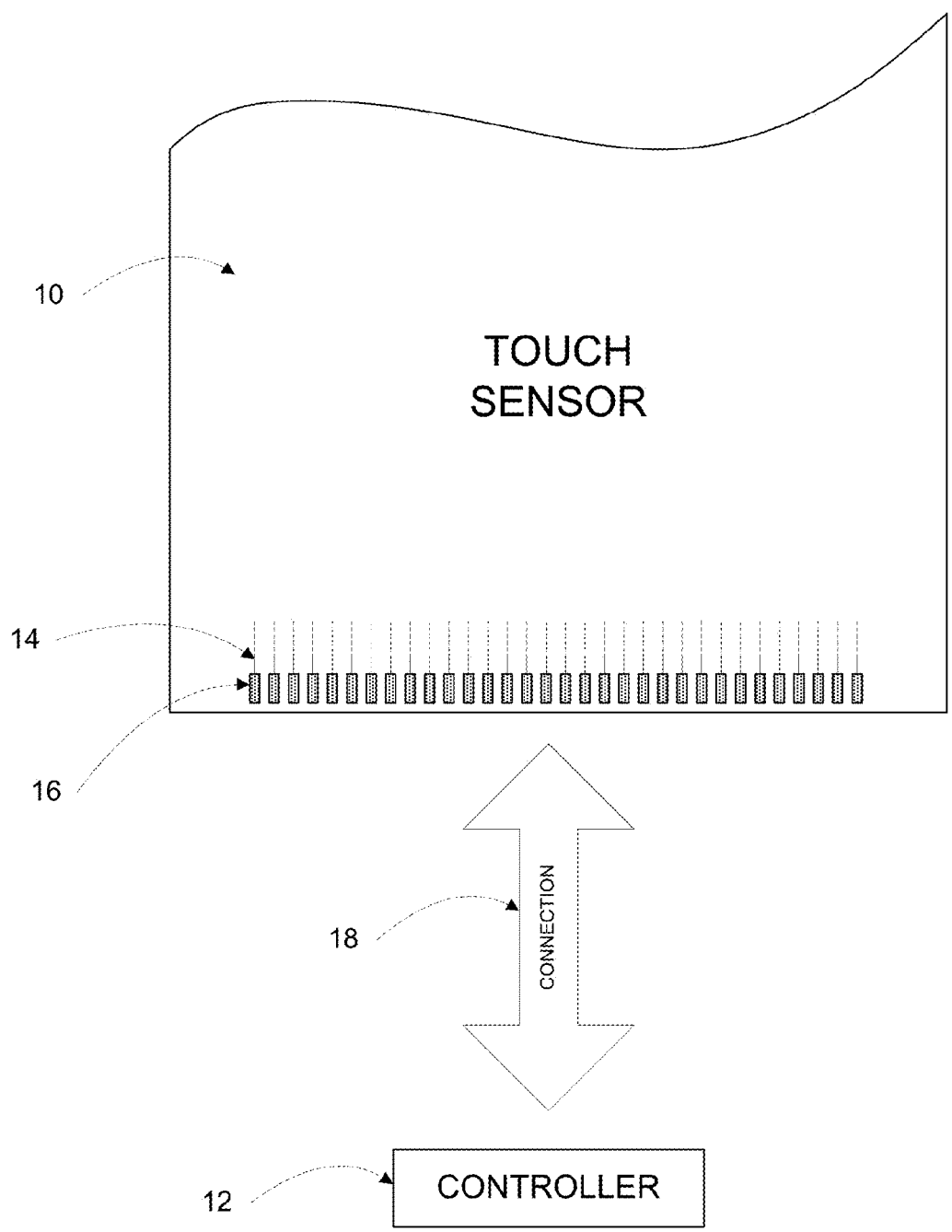
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such as one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
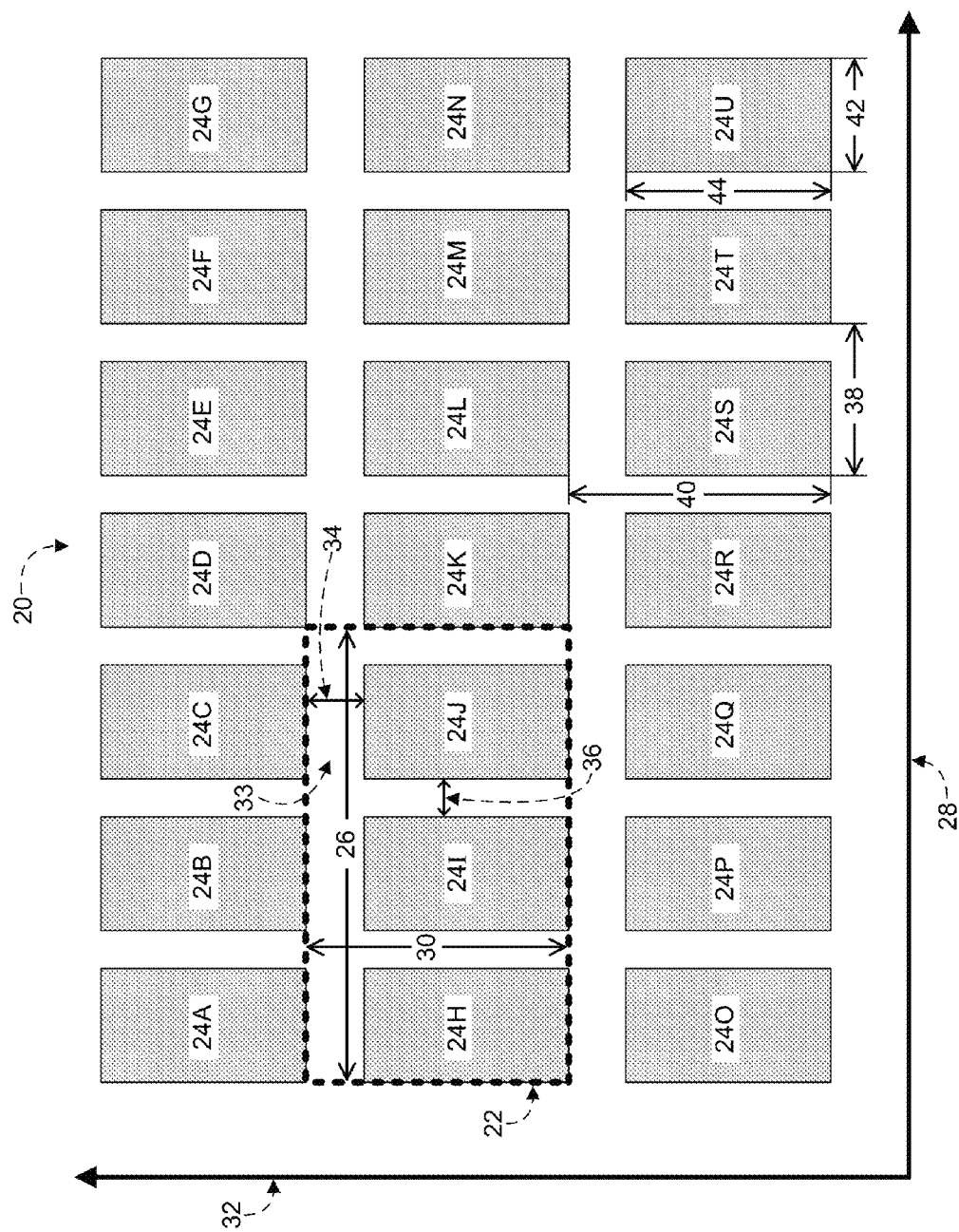
FIG. 2 illustrates an example portion of an example display that includes example pixels and sub-pixels.

FIG. 2 illustrates an example portion 20 of an example display that includes example pixels 22 and sub-pixels 24. A touch sensor may be overlaid on the display to implement a touch-sensitive display device, as described below. As an example and not by way of limitation, the display underneath the touch sensor may be a liquid crystal display (LCD), a light-emitting diode (LED) display, an LED backlight LCD, an electrophoretic display, a plasma display, or other suitable display. Although this disclosure describes and illustrates a particular display and particular display types, this disclosure contemplates any suitable device display and any suitable display types.

Portion 20 includes an array of pixels 22. In the example of FIG. 2, each pixel 22 includes three sub-pixels 24. In particular embodiments, pixel 22 may include one, two, three, four, or any suitable number of sub-pixels. In particular embodiments, each sub-pixel 24 may correspond to a particular color, such as for example red, green, or blue. The area of example pixel 22 (which may include dead space as discussed below) is indicated by the dashed-line border that encompasses sub-pixels 24H, 24I, and 24J in FIG. 2, where each sub-pixel may correspond to the color red, green, or blue, respectively. The combined output of sub-pixels 24 determines the color and intensity of each pixel 22. Although this disclosure describes and illustrates example pixels 22 with a particular number of sub-pixels 24 having particular colors, this disclosure contemplates any suitable pixels with any suitable number of sub-pixels having any suitable colors.

Pixels 22 and sub-pixels 24 may be arranged in a repeating pattern along a horizontal axis 28 and a vertical axis 32 that are perpendicular to each other. In particular embodiments, horizontal axis 28 may be referred to as an x-axis or a first axis, and vertical axis 32 may be referred to as a y-axis or a second axis. Each pixel 22 has a horizontal pixel pitch ($PP_x$) 26, which in particular embodiments may be defined as the distance between corresponding features of two adjacent pixels 22 along horizontal axis 28 (such as the distance from the left edge of sub-pixel 24H to the left edge of sub-pixel 24K). Each pixel 22 also has a vertical pixel pitch ($PP_y$) 30, which in particular embodiments may be defined as the distance between corresponding features of two adjacent pixels along vertical axis 32 (such as the distance from the lower edge of sub-pixel 24I to the lower edge of sub-pixel 24B). In particular embodiments, horizontal pixel pitch 26 may be referred to as a pixel width or the width of pixel 22, and vertical pixel pitch 30 may be referred to as a pixel height or the height of pixel 22. Although this disclosure describes and illustrates particular axes having particular orientations relative to one another, this disclosure contemplates any suitable axes having any suitable orientation relative to one another.

Pixel 22 and sub-pixel 24 may have a substantially rectangular shape, as illustrated in FIG. 2. Pixel 22 and sub-pixel 24 may have other suitable shapes, including but not limited to square, round, oval, or chevron-shaped. In particular embodiments, horizontal pixel pitch 26 may be approximately 50 μm, 100 μm, 150 μm, 200 μm, 250 μm, 300 μm, or any suitable dimension. In particular embodiments, vertical pixel pitch 30 may be approximately 50 μm, 100 μm, 150 μm, 200 μm, 250 μm, 300 μm, or any suitable dimension. In particular embodiments, horizontal pixel pitch 26 may be approximately the same as vertical pixel pitch 30, and pixel 22 may have a substantially square shape. In particular embodiments, pixel 22 having a substantially square shape may refer to horizontal pixel pitch 26 and vertical pixel pitch 26 having approximately the same dimension to within 1%, 2%, 5%, or to within any suitable percentage. As an example and not by way of limitation, a display may include pixels 22 with horizontal pixel pitch 26 and vertical pixel pitch 30 equal to 100 µm±1%, and pixels 22 may have a square shape with a 100-µm±1-µm height and a 100-µm±1-µm width. As another example and not by way of limitation, a display may have pixels 22 with horizontal pixel pitch 26 and vertical pixel pitch 30 approximately equal to 250 µm±2%, and pixels 22 may have a square shape with a height and width of 250 µm±5 µm. As another example and not by way of limitation, a display may include pixels 22 that are substantially square with a horizontal pixel pitch 26 of 99-µm±1-µm and a vertical pixel pitch 30 of 101-µm±1-µm. Although this disclosure describes and illustrates particular pixels having particular dimensions and particular pixel pitches, this disclosure contemplates any suitable pixels having any suitable dimensions and any suitable pixel pitches.

Each pixel 22 may also include dead space 33, which corresponds to regions of pixel 22 not occupied by a sub-pixel 24. In particular embodiments, sub-pixel 24 may include a color element that emits a particular color (e.g., red, green, or blue), and sub-pixel 24 may be separated from adjacent sub-pixels 24 by dead space 33. In particular embodiments, dead space 33 may include circuitry (e.g., conductive traces, wiring, drive transistors, or any suitable other electronic components) associated with providing a drive current or voltage to a color-emitting element of sub-pixel 24. In particular embodiments, dead space 33 has a height (DSH) 34 that may be defined as the distance between adjacent sub-pixels 24 along vertical axis 32 (such as the distance between the top edge of sub-pixel 24J and the bottom edge of sub-pixel 24C). In particular embodiments, dead space 33 has a width (DSW) 36 that may be defined as the distance between adjacent sub-pixels 24 along horizontal axis 28 (such as the distance between the right edge of sub-pixel 24I and the left edge of sub-pixel 24J). This disclosure contemplates any suitable pixels with any suitable dead space having any suitable dimensions.

Each sub-pixel 24 has a horizontal sub-pixel pitch (HSPP) 38, which may be defined in particular embodiments as the distance between corresponding features of two adjacent sub-pixels along horizontal axis 28, including width 36 of dead space 33 (such as the distance between the left edges of sub-pixels 24S and 24T). Each sub-pixel 24 also has a vertical sub-pixel pitch (VSPP) 40, which may be defined in particular embodiments as the distance between corresponding features of two adjacent sub-pixels along vertical axis 32, including height 34 of dead space 33 (such as the distance between the lower edges of sub-pixels 24S and 24L). In particular embodiments, horizontal pixel pitch 26 is equal to three times HSPP 38, so that $$PP_x = 3 \times HSPP, \text{ or } HSPP = \frac{1}{3} \times PP_x.$$

In particular embodiments, vertical pixel pitch 30 is equal to VSPP 40.

Each sub-pixel 24 has a sub-pixel width (SPW) 42, which may be defined in particular embodiments as the dimension of sub-pixel 24 along horizontal axis 28 (such as the distance between the left and right edges of sub-pixel 24U). In particular embodiments, SPW 42 may be referred to as a distance between opposing edges of the color element of sub-pixel 24 along horizontal axis 28. Each sub-pixel 24 also has a sub-pixel height (SPH) 44, which may be defined in particular embodiments as the dimension of sub-pixel 24 along vertical axis 32 (such as the distance between the lower and upper edges of sub-pixel 24U). In particular embodiments, SPH 44 may be referred to as a distance between opposing edges of the color element of sub-pixel 24 along vertical axis 32. In the example of FIG. 2, horizontal pixel pitch 26 is equal to three times HSPP 38, and HSPP 38 is equal to the sum of SPW 42 and DSW 36. In the example of FIG. 2, vertical sub-pixel pitch 40 is equal to vertical pixel pitch 30, and vertical pixel pitch 30 is equal to the sum of SPH 44 and DSH 34. In particular embodiments, each pixel 22 may include three sub-pixels 24, and each sub-pixel 24 may have approximately the same dimensions.

In particular embodiments, pixel 22 may have a substantially square shape so that $PP_x \cong PP_y$. As an example and not by way of limitation, pixel 22 may have a square shape with height and width of approximately 150 µm. Such a 150-µm square pixel 22 may have a HSPP 38 of approximately 50 µm since $$HSPP = \frac{1}{3} \times PP_x = \frac{1}{3} \times (150 \ \mu m) = 50 \ \mu m.$$

Moreover, SPW 42 may be approximately 42 µm, and DSW 36 may be approximately 8 µm, which corresponds to a HSPP 38 of 50 µm. Similarly, SPH 44 may be approximately 140 µm, and DSH 34 may be approximately 10 µm, which corresponds to a vertical pixel pitch 30, or pixel height, of 150 µm. Although this disclosure describes and illustrates particular sub-pixels having particular dimensions and pitches, this disclosure contemplates any suitable sub-pixels having any suitable HSPPs, VSPPs, SPWs, and SPHs with any suitable values. Moreover, although this disclosure describes and illustrates particular pixels 22 and sub-pixels 24 having particular shapes, arrangements, and dimensions, this disclosure contemplates any suitable arrangement of any suitable pixels and sub-pixels having any suitable shapes and dimensions.

Figure 3:
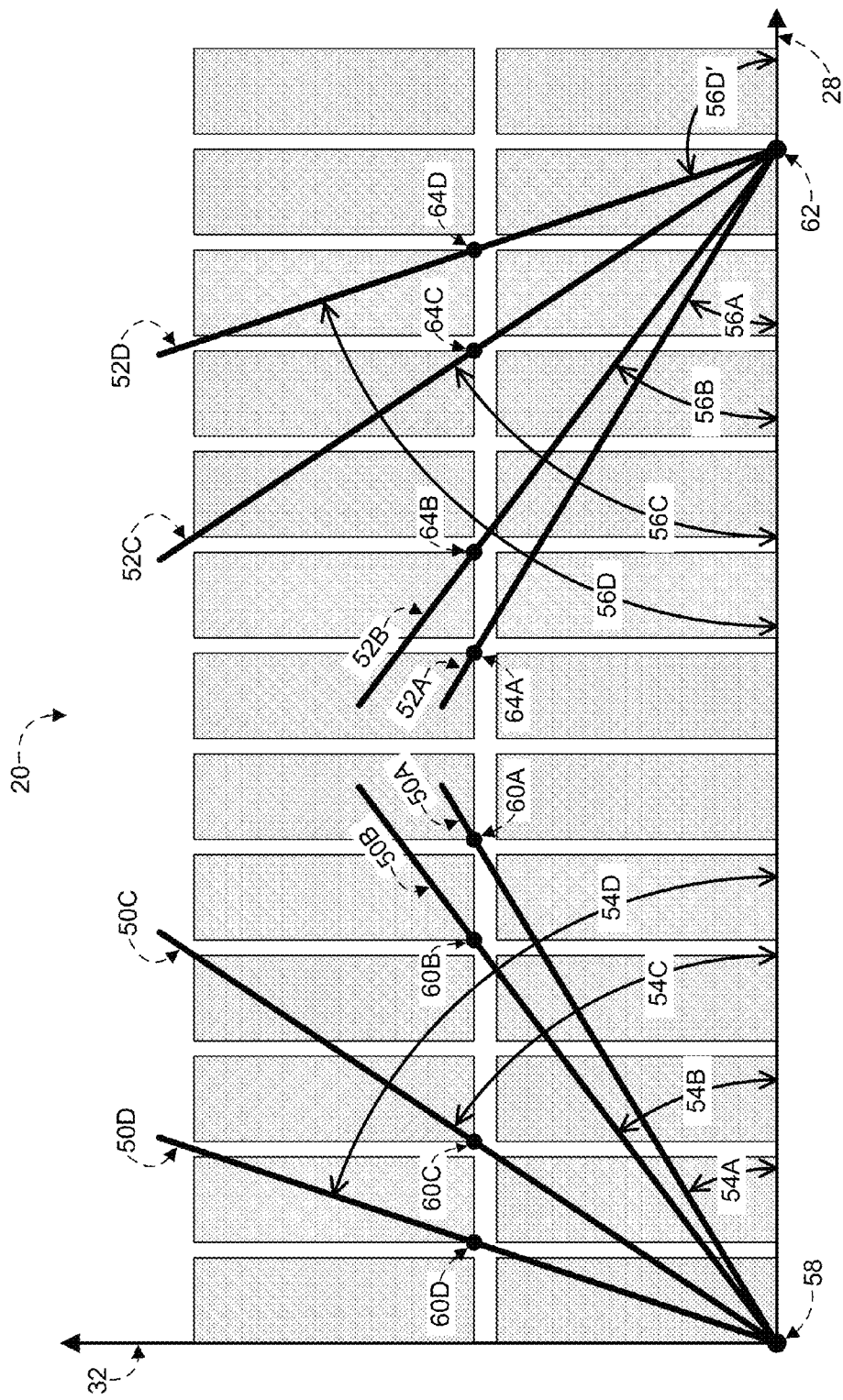
FIG. 3 illustrates another example portion of an example display with example conductive lines overlying the display portion.

FIG. 3 illustrates another example portion 20 of an example display with example conductive lines 50 and 52 overlying display portion 20. Conductive lines 50 and 52 may be FLM and may make up part of a mesh pattern of an electrode of a touch sensor. In particular embodiments, an arrangement of conductive lines may be referred to as a mesh pattern or a mesh design. Although this disclosure describes and illustrates a touch sensor overlying a display, this disclosure contemplates suitable portions of a touch sensor (including suitable portions of conductive lines 50 and 52) being disposed on one or more layers on or within a display stack of the display, where appropriate.

FIG. 3 illustrates four example conductive lines 50A, 50B, 50C, and 50D oriented at angles 54A, 54B, 54C, and 54D, respectively, relative to horizontal axis 28. FIG. 3 also illustrates another four example conductive lines 52A, 52B, 52C, and 52D oriented at angles 56A, 56B, 56C, and 56D, respectively, relative to horizontal axis 28. Conductive lines 50 are oriented at angles 54 in a counterclockwise direction relative to horizontal axis 28, while conductive lines 52 are oriented at angles 56 in a clockwise direction relative to horizontal axis 28. In particular embodiments, a mesh design may include two sets of conductive lines, where the first set includes conductive lines that are substantially parallel and have a counterclockwise orientation with respect to horizontal axis 28 at an angle 54A, 54B, 54C, or 54D, and the second set includes conductive lines that are substantially parallel and have a clockwise orientation with respect to horizontal axis 28 at an angle 56A, 56B, 56C, or 56D.

In the example of FIG. 3, each angle 54 of conductive lines 50 may be illustrated by drawing lines that pass through reference point 58 and one of reference points 60A, 60B, 60C, or 60D. In FIG. 3, reference point 58 is located at a lower-left corner of a sub-pixel 24, and reference points 60A, 60B, 60C, or 60D are located at a lower-left corner of another sub-pixel 24 located one vertical pixel pitch 30 up and an integer number of HSPPs 38 over from reference point 58. Similarly, each angle 56 of conductive lines 52 may be illustrated by drawing lines that pass through reference point 62 and one of reference points 64A, 64B, 64C, or 64D. In the example of FIG. 3, reference point 62 is located at a lower-right corner of a sub-pixel 24, and reference points 64A, 64B, 64C, or 64D are located at a lower-right corner of another sub-pixel 24 located one vertical pixel pitch 30 up and an integer number of HSPPs 38 over from reference point 62. Points 58, 60, 62, and 64 are reference points that are intended as a guide to illustrating or constructing angles 54 and 56, and points 58, 60, 62, and 64 are not constrained to be located only at particular reference points such as lower-left or lower right corners of particular sub-pixels 24. As an example and not by way of limitation, points 58, 60, 62, and 64 may be referenced to locations such as a corner, an edge, or a center of particular sub-pixels 24. Similarly, conductive lines 50 and 52 are not constrained to pass through any particular reference points (e.g., 58, 60, 62, or 64); rather, conductive lines 50 and 52 are at least in part characterized by their angles, 54 and 56, respectively, with respect to horizontal axis 28. Although this disclosure describes and illustrates particular conductive lines having particular angles, this disclosure contemplates any suitable conductive lines having any suitable angles. Moreover, although this disclosure describes and illustrates particular conductive lines having particular angles defined by particular reference points, this disclosure contemplates any suitable conductive lines having any suitable angles defined by any suitable reference points.

In FIG. 3, the slope of a conductive line 50 may be defined as a vertical rise of conductive line 50 divided by a horizontal run of conductive line 50, and angle 54 can be found from the arctangent of the slope. In the example of FIG. 3, the vertical rise of conductive lines 50 is vertical pixel pitch 30 ($PP_y$), and the horizontal run of conductive lines 50 is an integer multiple of HSPP 38, which may be expressed as m×HSPP, where m is a positive integer. Since, as described above, $$HSPP = \frac{1}{3} \times PP_x,$$

the horizontal run of conductive lines 50 may be expressed as $$m \times \frac{1}{3} \times PP_x.$$

As an example and not by way of limitation, for conductive line 50B in FIG. 3, m equals 4 since reference point 60B is located 4 HSPPs over from reference point 58, and the horizontal run of conductive line $$54B \text{ is } \frac{4}{3} \times PP_x.$$

In particular embodiments, the slope of conductive lines 50 may be expressed as $$\frac{PP_y}{\left(m \times \frac{1}{3} \times PP_x\right)},$$

where m is a positive integer, and angle 54 ($\Theta_{54}$) can be found from the expression $$\theta_{54} = \arctan\left[\frac{PP_y}{\left(m \times \frac{1}{3} \times PP_x\right)}\right] = \arctan\left[\frac{3}{m} \times \frac{PP_y}{PP_x}\right].$$

In FIG. 3, for angles 54A, 54B, 54C, and 54D, m is equal to 5, 4, 2, and 1, respectively, and angles 54A, 54B, 54C, and 54D may be expressed as $$\theta_{54A} = \arctan\left[\frac{3}{5} \times \frac{PP_y}{PP_x}\right], \theta_{54B} = \arctan\left[\frac{3}{4} \times \frac{PP_y}{PP_x}\right],$$
$$\theta_{54C} = \arctan\left[\frac{3}{2} \times \frac{PP_y}{PP_x}\right], \text{ and } \theta_{54D} = \arctan\left[3 \times \frac{PP_y}{PP_x}\right],$$

respectively. In particular embodiments, pixel 22 may have a substantially square shape, and $PP_x$ and $PP_y$ may be approximately equal. For such pixels 22 with a square shape, angles 54A, 54B, 54C, and 54D may then be expressed as $\theta_{54A}=\arctan(3/5)\approx30.96°$, $\theta_{54B}=\arctan(3/4)\approx36.87°$, $\theta_{54C}=\arctan(3/2)\approx56.31°$, and $\theta_{54D}=\arctan(3)\approx71.57°$, respectively.

In FIG. 3, the slope of a conductive line 52 may similarly be defined as a vertical rise of conductive line 52 divided by a horizontal run of conductive line 52, and angle 56 can be found from the arctangent of the slope. In the example of FIG. 3, the vertical rise of conductive lines 52 is vertical pixel pitch 30 ($PP_y$), and the horizontal run of conductive lines 50 is an integer multiple of HSPP 38, which may be expressed as n×HSPP, where n is a positive integer. Since, as described above, $$HSPP = \frac{1}{3} \times PP_x,$$

the horizontal run of conductive lines 52 may be expressed as $$n \times \frac{1}{3} \times PP_x.$$

As an example and not by way of limitation, for conductive line 52C in FIG. 3, n equals 2 since reference point 64C is located 2 HSPPs over from reference point 62, and the horizontal run of conductive line $$52C \text{ is } \frac{2}{3} \times PP_x.$$

In particular embodiments, the slope of conductive lines 52 may be expressed as $$\frac{PP_y}{\left(n \times \frac{1}{3} \times PP_x\right)},$$

where n is a positive integer, and angle 56 ($\theta_{56}$) can be found from the expression $$\theta_{56} = \arctan\left[\frac{PP_y}{\left(n \times \frac{1}{3} \times PP_x\right)}\right] = \arctan\left[\frac{3}{n} \times \frac{PP_y}{PP_x}\right].$$

In FIG. 3, for angles 56A, 56B, 56C, and 56D, n is equal to 5, 4, 2, and 1, respectively, and angles 56A, 56B, 56C, and 56D may be expressed as $$\theta_{56A} = \arctan\left[\frac{3}{5} \times \frac{PP_y}{PP_x}\right], \theta_{56B} = \arctan\left[\frac{3}{4} \times \frac{PP_y}{PP_x}\right],$$

$$\theta_{56C} = \arctan\left[\frac{3}{2} \times \frac{PP_y}{PP_x}\right], \text{ and } \theta_{56D} = \arctan\left[3 \times \frac{PP_y}{PP_x}\right],$$

respectively. In particular embodiments, pixel 22 may have a substantially square shape, and $PP_x$ and $PP_y$ may be approximately equal. For such pixels 22 with a square shape, angles 56A, 56B, 56C, and 56D may then be expressed as $\theta_{56A}=\arctan(3/5)\cong30.96°$, $\theta_{56B}=\arctan(3/4)\cong36.87°$, $\theta_{56C}=\arctan(3/2)\cong56.31°$, and $\theta_{56D}=\arctan(3)\cong71.57°$, respectively. In particular embodiments, angles 54A, 54B, 54C, and 54D may have the same magnitude as angles 56A, 56B, 56C, and 56D, respectively. In particular embodiments, a mesh design may include angles 54 and 56 with approximately the same magnitude, and the associated conductive lines 50 and 52 may appear to be reflected about a vertical axis.

In FIG. 3, conductive lines 52 are described as having a $\theta_{56}$ clockwise orientation with respect to horizontal axis 28. In particular embodiments, conductive lines 52 may be described as having a $\theta'_{56}$ counterclockwise orientation with respect to horizontal axis 28, where $\theta'_{56}$ is the supplementary angle of $\theta_{56}$ such that $\theta'_{56}=180°-\theta_{56}$. In FIG. 3, angle 56D is indicated along with its supplementary angle 56D'. As an example and not by way of limitation, if pixel 22 has a substantially square shape, conductive line 52A may be described as having a $\theta'_{56A}$ counterclockwise orientation with respect to horizontal axis, where $\theta'_{56A}\cong180°-30.96°=149.04°$. Similarly, for substantially square pixels 22, conductive lines 52B, 52C, and 52D may be described as having a $\theta'_{56}$ counterclockwise orientation with respect to horizontal axis, where $\theta'_{56B}\cong143.13°$, $\theta'_{56C}\cong123.69°$, and $\theta'_{56D}\cong108.43°$, respectively.

In particular embodiments, a mesh design may be formed or described by selecting an angle 54 for a first set of conductive lines 50 and selecting another angle 56 for a second set of conductive lines 52. For the first set of conductive lines 50 of a mesh design, angle 54 may be determined from the expression above for $\theta_{54}$, where m is 1, 2, 4, 5, or any suitable positive integer. Similarly, for the second set of conductive lines 52 of a mesh design, angle 56 may be determined from the expression above for $\theta_{56}$, where n is 1, 2, 4, 5, or any suitable positive integer. In particular embodiments, m and n may be the same, and angles $\theta_{54}$ and $\theta_{56}$ may be the same. In particular embodiments, m and n may be different, and angles $\theta_{54}$ and $\theta_{56}$ may be different. In particular embodiments, conductive lines 50 and 52 may make up part of a mesh pattern of a touch sensor and angles $\theta_{54}$ and $\theta_{56}$ may vary by up to 0.2°, 0.5°, 1°, or any suitable angular amount from the values calculated in the expressions above without substantially degrading the optical performance of the mesh pattern. Angles $\theta_{54}$ and $\theta_{56}$ of conductive lines 50 and 52 in FIGS. 4-8 (which are described below) may similarly vary. In particular embodiments, a mesh pattern for a display with substantially square pixels 22 may include conductive lines 50 with angle 54 that is within 1° of 30.96°, 36.87°, 56.31°, or 71.57° and conductive lines 52 with angle 56 that is within 1° of 30.96°, 36.87°, 56.31°, or 71.57°. As an example and not by way of limitation, a mesh pattern for a display with substantially square pixels 22 may include conductive lines 50 with angle 54 that is within 1° of 36.87° (e.g., between 35.87° and 37.87°), and conductive lines 52 with angle 56 that is within 1° of 56.31° (e.g., between 55.31° and 57.31°). As another example and not by way of limitation, a mesh pattern for a display with substantially square pixels 22 may include conductive lines 50 and 52 with angles 54 and 56, respectively, that are within 1° of 36.87°. As other examples and not by way of limitation, a mesh pattern may include conductive lines 50 and 52 that are within 1° of any of the following combinations of angles 54 and 56, respectively: 30.96° and 56.31°; 36.87° and 71.57°; or 30.96° and 71.57°. Although this disclosure describes and illustrates particular conductive lines having particular angles with respect to a particular axis of a display, this disclosure contemplates any suitable conductive lines having any suitable angles with respect to any suitable axes of a display.

In the example of FIG. 3, conductive line 50 is oriented counterclockwise at angle 54 relative to horizontal axis 28, and conductive line 52 is oriented clockwise at angle 56 relative to horizontal axis 28. In particular embodiments, conductive line 50 may be oriented clockwise at angle 54 relative to horizontal axis 28, and conductive line 52 may be oriented counterclockwise at angle 56 relative to horizontal axis 28. In particular embodiments, conductive line 50 may be oriented clockwise or counterclockwise at angle 54 relative to horizontal axis 28, and conductive line 52 may be oriented clockwise or counterclockwise at angle 56 relative to horizontal axis 28. Although this disclosure describes and illustrates example conductive lines 50 and 52 having particular orientations relative to horizontal axis 28, this disclosure contemplates any suitable clockwise or counterclockwise orientation of conductive lines relative to any suitable axis. As described above, angles 54 and 56 may vary by up to approximately 1° from the values calculated in the expressions above without substantially degrading the optical performance of the mesh pattern. Such rotation of up to approximately 1° may occur during a manufacturing process, for example. Similarly, a mesh pattern made up of conductive lines 50 and 52 in any of FIGS. 4-8 (described below) may have conductive lines 50 and 52 with any suitable clockwise or counterclockwise rotational orientation and a variation of angles 54 and 56 of up to approximately 1°.

In particular embodiments, a mesh pattern may have any suitable orthogonal alignment to within ±1° relative to pixels 22 and sub-pixels 24 (which may differ from the alignment illustrated in FIG. 3). For example, the mesh pattern may be displaced horizontally, vertically, or both relative to pixels 22 and sub-pixels 24 (as may occur during a manufacturing process) without substantially degrading the optical performance of the mesh pattern. In particular embodiments, conductive line 50 need not be constrained to pass through points 58 and 60 but may be displaced along horizontal axis 28 and vertical axis 32 by any suitable amount. Similarly, in particular embodiments, conductive line 52 need not be constrained to pass through points 62 and 64 but may also be displaced along horizontal axis 28 and vertical axis 32 by any suitable amount. A mesh pattern made up of conductive lines 50 and 52 in any of FIGS. 4-8 (which are described below) may similarly have any suitable alignment or displacement.

FIGS. 4-8 illustrate example mesh designs overlying other example portions 20 of example displays. Display portions 20 include pixels 22 arranged along horizontal axis 28 and vertical axis 32. In FIGS. 4-8, each pixel 22 has horizontal pixel pitch 26 ($PP_x$) and vertical pixel pitch 30 ($PP_y$), and each pixel 22 includes three sub-pixels 24. Pixels 22 in FIGS. 4-8 are substantially square so that $PP_x$ and $PP_y$ are approximately the same. The example mesh designs in FIGS. 4-8 include conductive lines 50 and 52, and conductive lines 50 and 52 may be FLM and may make up part of a mesh pattern of an electrode of a touch sensor. Conductive lines 50 in each of FIGS. 4-8 are substantially parallel to each other, and each conductive line 50 forms an angle 54 relative to horizontal axis 28. Additionally, conductive lines 50 in each of FIGS. 4-8 are substantially evenly spaced from one another with adjacent conductive lines 50 having an equal separation distance 70 along horizontal axis 28. Conductive lines 52 in FIGS. 4-8 are also substantially parallel to each other, forming an angle 56 relative to horizontal axis 28. Conductive lines 52 are also substantially evenly spaced from one another with adjacent conductive lines 52 having an equal separation distance 72. In particular embodiments line separation distances 70 and 72 may be referred to as separation distances or line spacings.

In particular embodiments, conductive lines 50 have a separation distance 70 along horizontal axis 28 that may be expressed as $D_{50}=k \times 3 \times PP_x$, where $D_{50}$ is separation distance 70 of conductive lines 50, k is a positive integer, and $PP_x$ is horizontal pixel pitch 26. In particular embodiments, k may be referred to as a line-separation parameter. Similarly, in particular embodiments, conductive lines 52 have a separation distance 72 along horizontal axis that may be expressed as $$D_{52} = k \times \frac{13}{6} \times PP_x,$$

where $D_{52}$ is separation distance 72 of conductive lines 52 and k is a positive integer. In particular embodiments, a mesh design where k=1 may be preferable for a display where $PP_x$ and $PP_x$ are on the order of 150 μm. In particular embodiments, a mesh design where k=2 may be preferable for a display where $PP_x$ and $PP_x$ are significantly less than 150 μm, such as for example a display where $PP_x \cong PP_y \cong 50$ μm. In particular embodiments, a perpendicular separation distance 74 between conductive lines 50 may be illustrated by line 74 which is perpendicular to conductive lines 50. Perpendicular separation distance 74 is related to separation distance 70 by the expression $D_{50,\perp}=D_{50} \sin \theta_{54}$, where $D_{50,\perp}$ is perpendicular separation distance 74. Similarly, in particular embodiments, a perpendicular separation distance 76 between conductive lines 52 may be illustrated by line 76 which is perpendicular to conductive lines 52. Perpendicular separation distance 76 is related to separation distance 72 by the expression $D_{52,\perp}=D_{52} \sin \theta_{56}$, where $D_{52,\perp}$ is perpendicular separation distance 76.

As described above, angle 54 in FIG. 4 may be expressed as $\theta_{54}=\arctan$ $$\left[\frac{3}{m} \times \frac{PP_y}{PP_x}\right].$$

Figure 4:
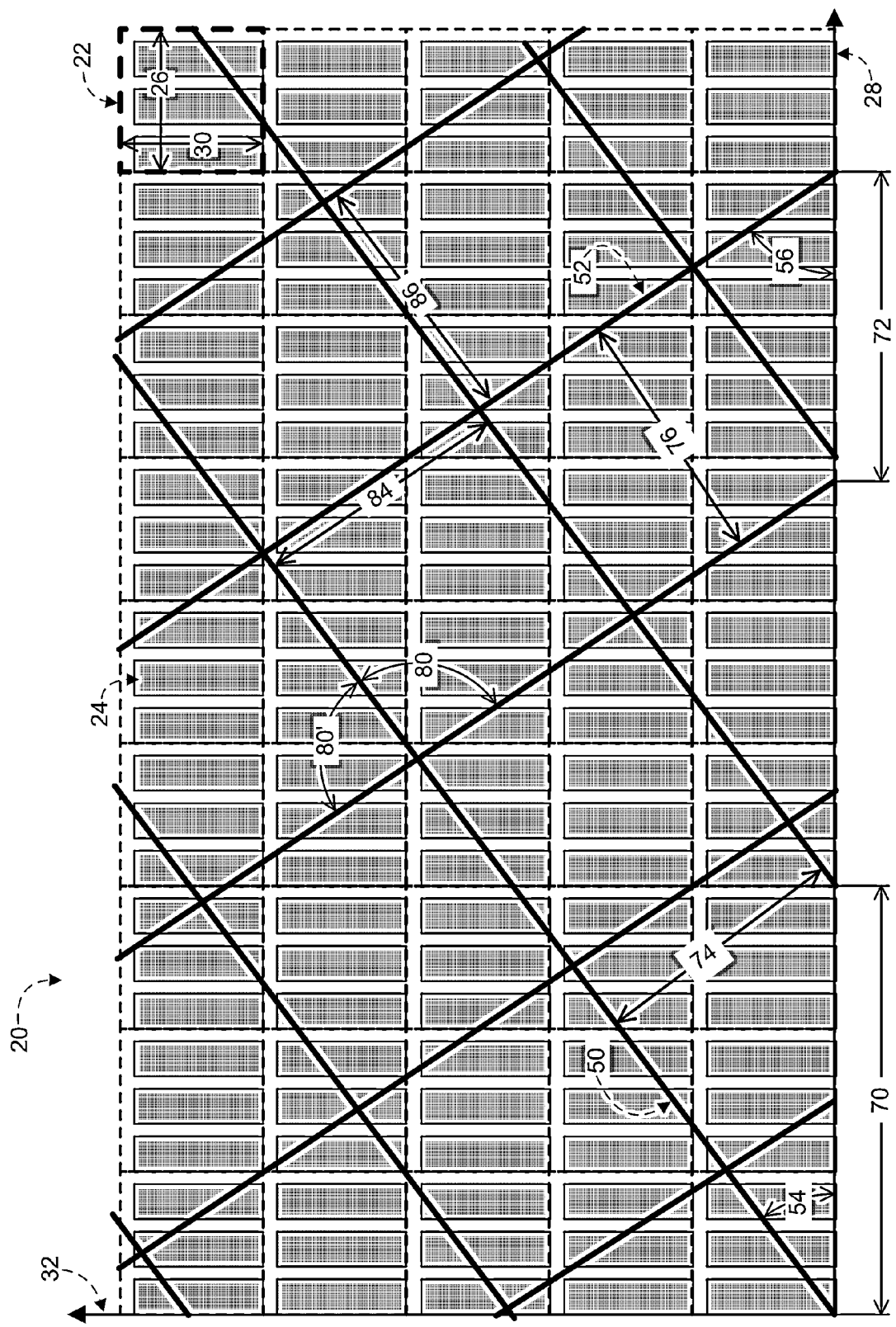
FIGS. 4-8 illustrate example mesh designs overlying other example portions of example displays.

In FIG. 4, $PP_x \cong PP_y$, and in the expression for angle 54, m equals 4, so that angle 54 is approximately 36.87°. Similarly, angle 56 in FIG. 4 may be expressed as $$\theta_{56} = \arctan\left[\frac{3}{n} \times \frac{PP_y}{PP_x}\right],$$

where n equals 2, so that angle 56 is approximately 56.31°. In FIG. 4, angle 80 ($\theta_{80}$) may be referred to as an angle between conductive lines 50 and 52, and angle 80 equals the sum of angles 54 and 56. In FIG. 4, angle 80 equals $\theta_{54}+\theta_{56}\cong36.87°+56.31°=93.18°$. In FIG. 4, angle 80' ($\theta'_{80}$) is another angle between conductive lines 50 and 52, and angle 80' is the supplement to angle 80, so that angle 80' is 180°−$\theta_{80}\cong86.82°$.

In particular embodiments, a segment length 84 may represent a length of conductive line 52 between two adjacent conductive lines 50. Segment length 84 is related to separation distance 70 by the expression $$S_{84} = D_{50} \times \frac{\sin\theta_{54}}{\sin\theta_{80}}.$$

Similarly, in particular embodiments, a segment length 86 may represent a length of conductive line 50 between two adjacent conductive lines 52. Segment length 86 is related to separation distance 72 by the expression $$S_{86} = D_{52} \times \frac{\sin\theta_{56}}{\sin\theta_{80}}.$$

In the example of FIG. 4, conductive lines 50 have a separation distance 70 along horizontal axis 28 that is substantially equal to three times horizontal pixel pitch 26 (or nine times HSPP 38), and conductive lines 52 have a separation distance 72 along horizontal axis 28 that is substantially equal to $$\frac{13}{6}$$

times horizontal pixel pitch 26 (or 6.5 times HSPP 38). In FIG. 4, the line-separation parameter k equals 1 so that separation distance 70 is $3 \times PP_x$, and separation distance 72 is $\frac{13}{6} \times PP_x.$ In FIG. 4, perpendicular separation distance 74 equals $3PP_x \sin \theta_{54}$, and perpendicular separation distance 76 equals $$\frac{13}{6} PP_x \sin\theta_{56}.$$

The mesh design of FIG. 4 may be preferable for a display with horizontal pixel pitch 26 and vertical pixel pitch 30 approximately equal to 150 µm. As an example and not by way of limitation, for $PP_x \cong PP_y \cong 150$ µm, separation distance 70 is approximately 3×(150 µm), or 450 µm, and separation distance 72 is approximately $$\frac{13}{6} \times (150 \ \mu m),$$

or 325 µm. Additionally, for $PP_x \cong PP_y \cong 150$ µm, perpendicular separation distance 74 is approximately (450 µm)×sin(36.87°), or 270.0 µm, and perpendicular separation distance 76 is approximately (325 µm)×sin(56.31°), or 270.4 µm. Moreover, segment length $$84 \text{ is } S_{84} = (450 \ \mu m) \times \frac{\sin 36.87°}{\sin 86.82°} \cong 270.4 \ \mu m,$$

and segment length 86 is $$S_{86} = (325 \ \mu m) \times \frac{\sin 56.31°}{\sin 86.82°} \cong 270.8 \ \mu m.$$

In particular embodiments, separation distances 70 and 72 and perpendicular separation distances 74 and 76 may vary by up to 0.5%, 1%, 2%, 3%, or by any suitable percentage. In particular embodiments, such variation in separation distance may occur during a manufacturing process. As an example and not by way of limitation, for a 1% variation in separation distances, separation distance 70 in FIG. 4 may be expressed as 450 µm±1%, or 450 µm±4.5 µm, and separation distance 72 may be expressed as 325 µm±1%, or 325 µm±3.3 µm. Additionally, for a 1% variation in separation distances, perpendicular separation distance 74 in FIG. 4 may be expressed as 270 µm±1%, or 270 µm±2.7 µm, and perpendicular separation distance 76 may be expressed as 270.4 µm±1%, or 270.4 µm±2.7 µm. Although this disclosure describes and illustrates particular mesh patterns having particular separation distances and particular variation of separation distances, this disclosure contemplates any suitable mesh patterns having any suitable separation distances and any suitable variation of separation distances.

Figure 5:
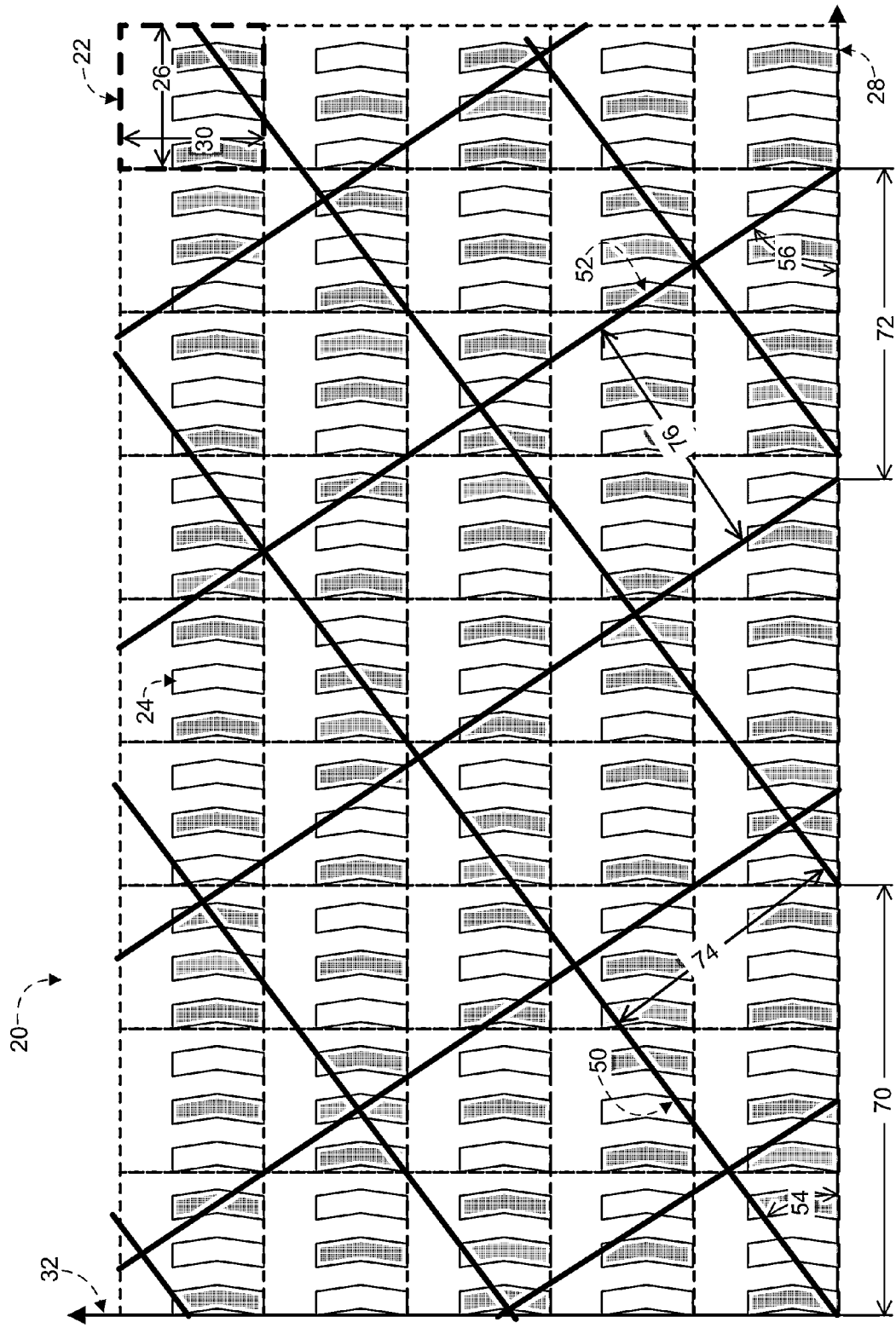

FIG. 5 illustrates the same example mesh design of FIG. 4 overlaid over an example portion 20 of a different example display. In particular embodiments, a single mesh design may be used with two or more different displays, where the two or more different displays have substantially the same horizontal pixel pitch 26 and substantially the same vertical pixel pitch 30. In particular embodiments, a single mesh design may be used with two or more different displays even though the two or more different displays may have sub-pixels 24 with different shapes or dimensions. Each pixel 22 in FIGS. 4 and 5 has substantially the same horizontal pixel pitch 26 and vertical pixel pitch 30, but sub-pixels 24 in FIGS. 4 and 5 have different shapes and dimensions. Pixels 22 in FIG. 4 have rectangular sub-pixels 24, while pixels 22 in FIG. 5 have chevron-shaped sub-pixels 24 with a different SPW 42 and SPH 44. As described above, angles 54 and 56 and separation distances 70 and 72 for a mesh design are determined based on horizontal pixel pitch 26 and vertical pixel pitch 30. Since pixels 22 in FIGS. 4 and 5 have substantially the same horizontal pixel pitch 26 and vertical pixel pitch 30, the mesh designs in FIGS. 4 and 5 have the same angles 54 and 56 and the same separation distances 70 and 72 for conductive lines 50 and 52, respectively. Although this disclosure describes and illustrates a particular mesh design that may be used with two or more different displays, this disclosure contemplates any suitable mesh designs that may be used with any suitable number of suitable different displays.

Figure 6:
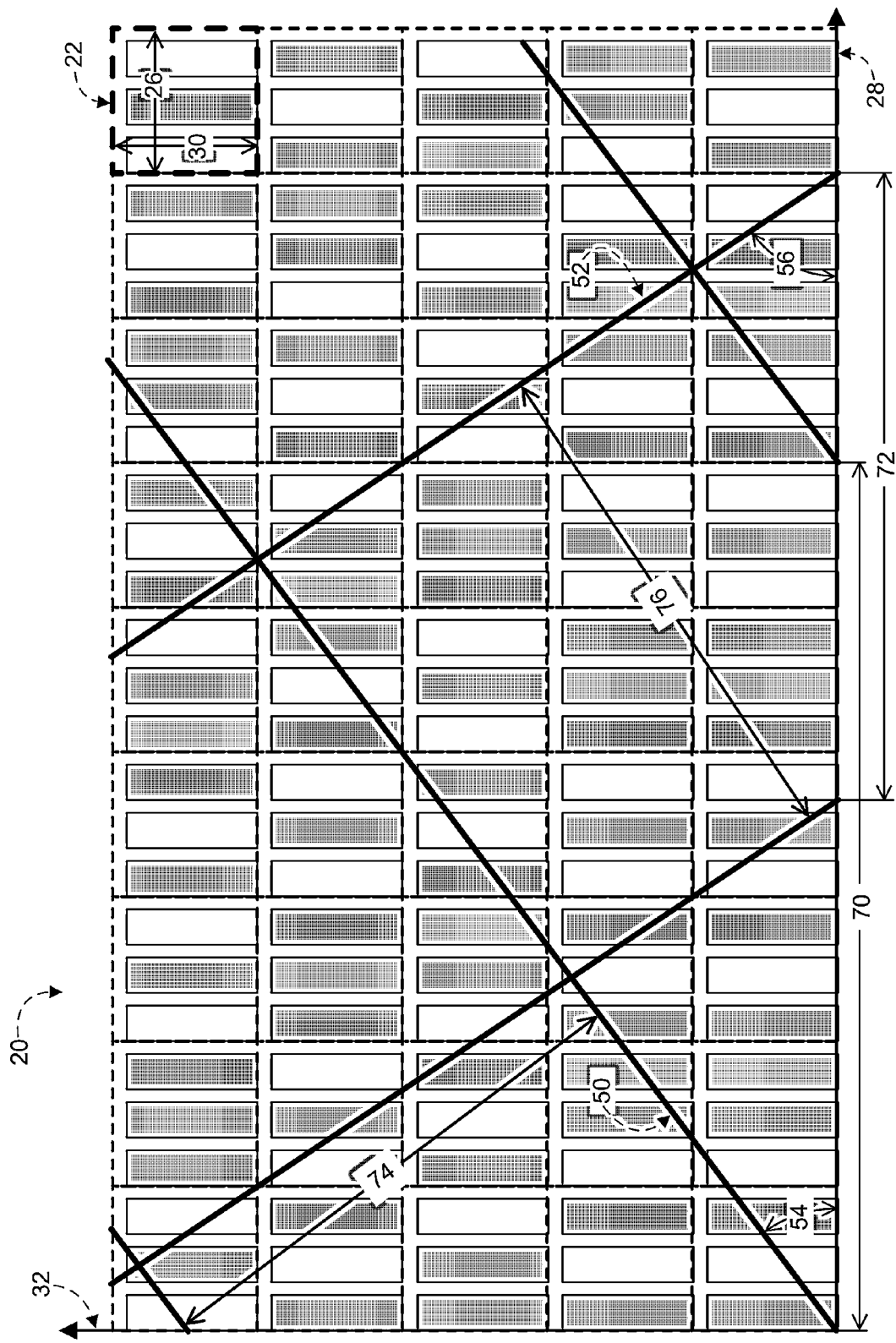

FIG. 6 illustrates another example mesh design overlying another example portion 20 of an example display. Angles 54 of conductive lines 50 in FIGS. 4 and 6 are approximately the same, and angles 56 of conductive lines 52 in FIGS. 4 and 6 are also approximately the same. In the example of FIG. 6, conductive lines 50 have a separation distance 70 along horizontal axis 28 that is substantially equal to six times horizontal pixel pitch 26 (or 18 times HSPP 38), and conductive lines 52 have a separation distance 72 along horizontal axis 28 that is substantially equal to $$\frac{13}{3}$$

times horizontal pixel pitch 26 (or 13 times HSPP 38). In FIG. 6, the line-separation parameter k equals 2 so that separation distance 70 is $6 \times PP_x$, and separation distance $$72 \text{ is } \frac{13}{3} \times PP_x.$$

In FIG. 6, perpendicular separation distance 74 equals $6PP_x \sin\theta_{54}$, and perpendicular separation distance 76 equals $$\frac{13}{3} PP_x \sin\theta_{56}.$$

The mesh design of FIG. 6 may be preferable for a display with horizontal pixel pitch 26 and vertical pixel pitch 30 that is substantially less than 150 µm. As an example and not by way of limitation, for $PP_x \cong PP_y \cong 50$ µm, separation distance 70 is approximately 6×(50 µm), or 300 µm, and separation distance 72 is approximately $$\frac{13}{3} \times (50 \ \mu m), \text{ or } 217 \ \mu m.$$

Additionally, perpendicular separation distance 74 is approximately (300 µm)×sin(36.87°), or 180.0 µm, and perpendicular separation distance 76 is approximately (217 µm)×sin(56.31°), or 180.6 µm.

Figure 7:
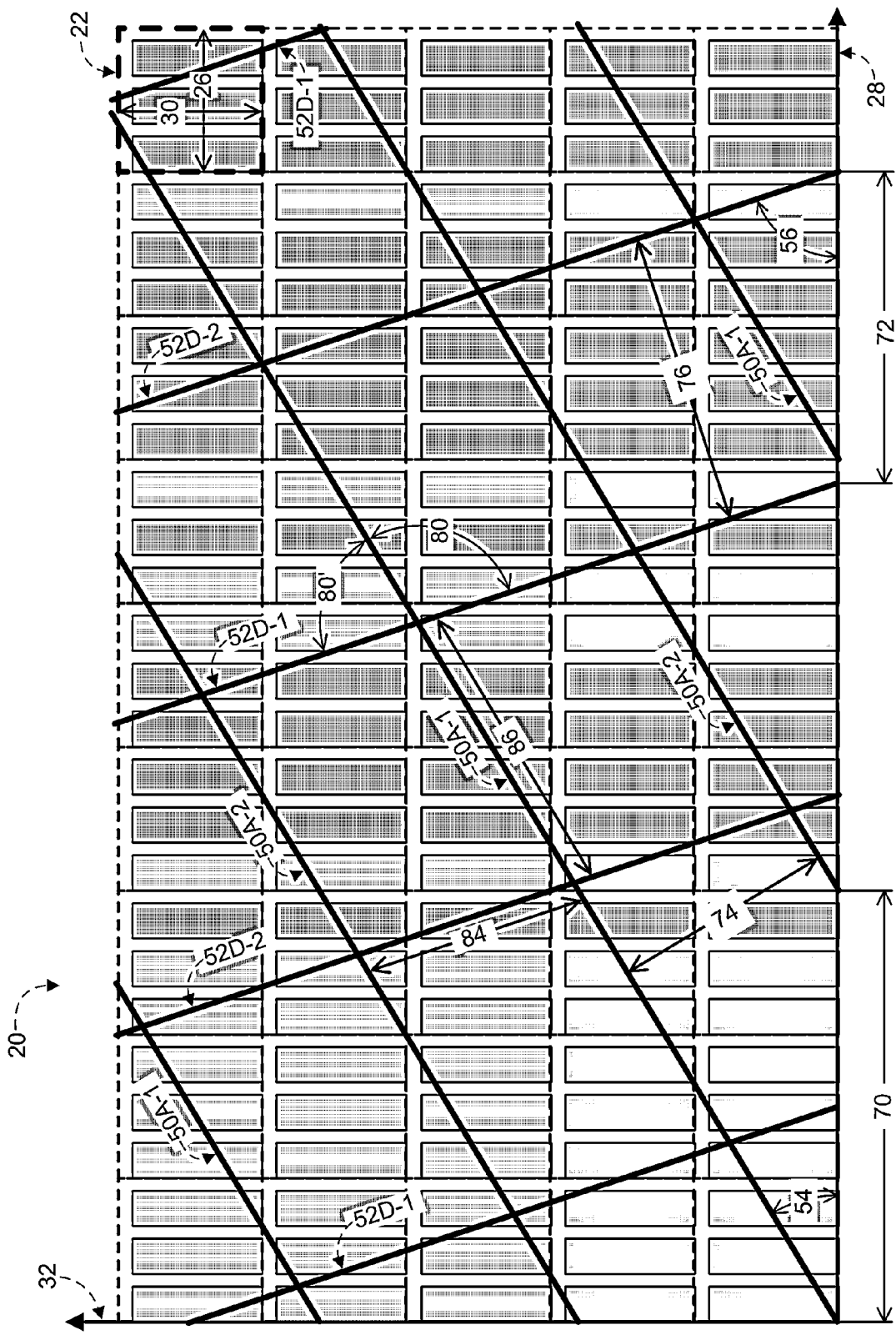

FIG. 7 illustrates another example mesh design overlying another example portion 20 of an example display. As described above, angle 54 in FIG. 7 may be expressed as $$\theta_{54} = \arctan\left[\frac{3}{m} \times \frac{PP_y}{PP_x}\right].$$

In FIG. 4, $PP_x \cong PP_y$, and in the expression for angle 54, m equals 5, so that angle 54 is approximately 30.96°. Similarly, angle 56 in FIG. 7 may be expressed as $$\theta_{56} = \arctan\left[\frac{3}{n} \times \frac{PP_y}{PP_x}\right],$$

where n equals 1, so that angle 56 is approximately 71.57°. In FIG. 7, angle 80 ($\theta_{80}$), an angle between conductive lines 50 and 52, equals the sum of angles 54 and 56. In FIG. 7, angle 80 equals $\theta_{54}+\theta_{56} \cong 30.96°+71.57°=102.53°$. In FIG. 7, angle 80', another angle between conductive lines 50 and 52, is the supplement of angle 80 and equals $180°-\theta_{80} \cong 77.47°$.

In the example of FIG. 7, the line-separation parameter k equals 1 so that separation distance 70 is $3 \times PP_x$, and separation distance 72 is $$\frac{13}{6} \times PP_x.$$

In FIG. 7, perpendicular separation distance 74 equals $3PP_x \sin \theta_{54}$, and perpendicular separation distance 76 equals $$\frac{13}{6} PP_x \sin \theta_{56}.$$

The mesh design of FIG. 4 may be preferable for a display with horizontal pixel pitch 26 and vertical pixel pitch 30 approximately equal to 150 μm. As an example and not by way of limitation, in FIG. 7, for $PP_x \cong PP_y \cong 150$ μm, separation distance 70 is approximately 3×(150 μm), or 450 μm, and separation distance 72 is approximately $$\frac{13}{6} \times (150 \text{ μm}),$$

or 325 μm. Additionally, perpendicular separation distance 74 is approximately (450 μm)×sin(30.96°), or 231.5 μm, and perpendicular separation distance 76 is approximately (325 μm)×sin(71.57°), or 308.3 μm. Moreover, segment length 84 is $$S_{84} = (450 \text{ μm}) \times \frac{\sin 30.96°}{\sin 77.47°} \cong 237.1 \text{ μm},$$

and segment length 86 is $$S_{86} = (325 \text{ μm}) \times \frac{\sin 72.57°}{\sin 77.47°} \cong 237.1 \text{ μm}.$$

Figure 8:
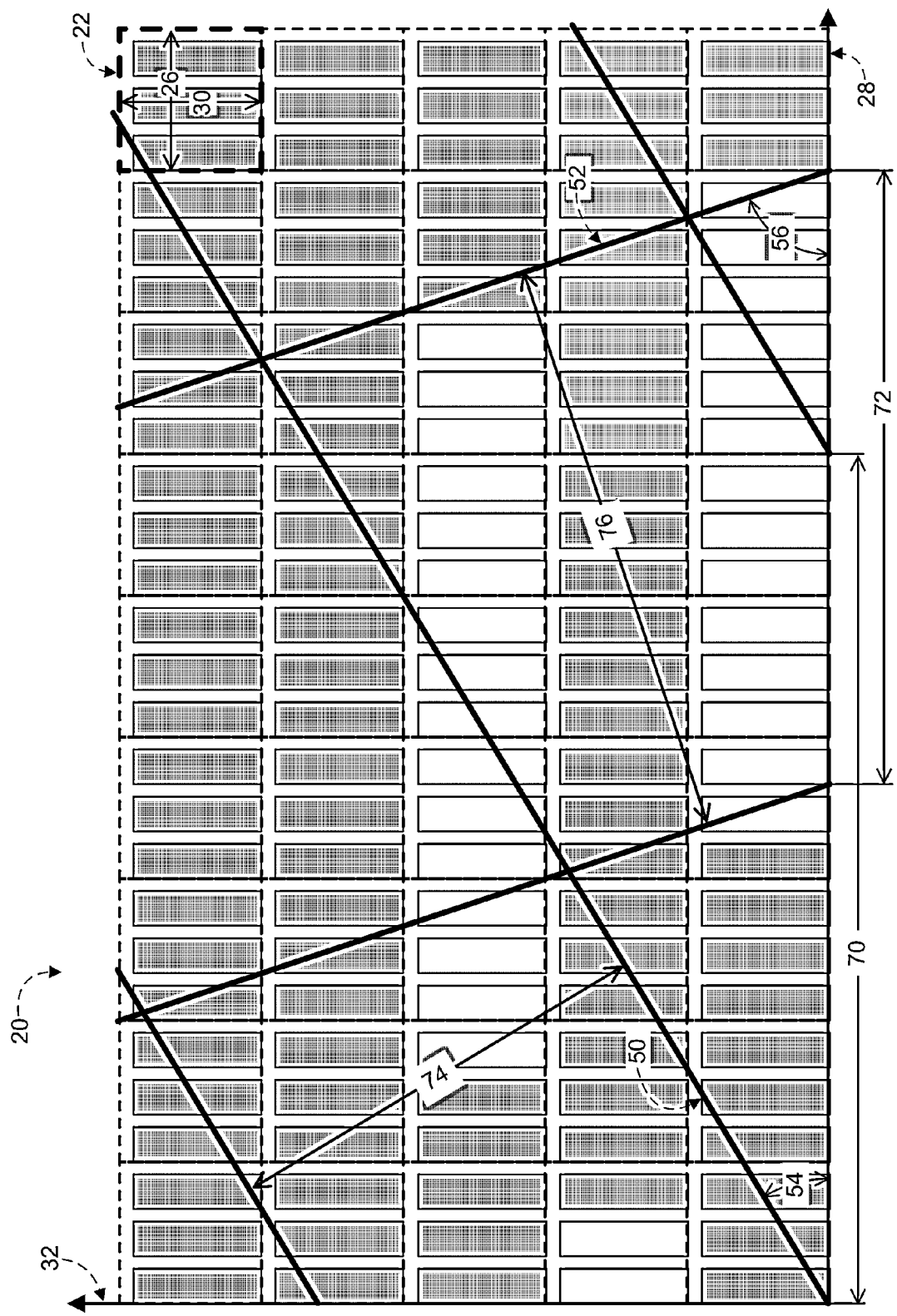

FIG. 8 illustrates another example mesh design overlying another example portion 20 of an example display. Angles 54 of conductive lines 50 in FIGS. 7 and 8 are approximately the same, and angles 56 of conductive lines 52 in FIGS. 7 and 8 are also approximately the same. The line-separation distances 70 and 72 in FIG. 8 are twice the respective line-separation distances 70 and 72 in FIG. 7. In FIG. 8, the line-separation parameter k equals 2 so that separation distance 70 is $6 \times PP_x$, and separation distance 72 is $$\frac{13}{3} \times PP_x.$$

In FIG. 8, perpendicular separation distance 74 equals $6PP_x \sin \theta_{54}$, and perpendicular separation distance 76 equals $$\frac{13}{3} PP_x \sin \theta_{56}.$$

The mesh design of FIG. 8 may be preferable for a display with horizontal pixel pitch 26 and vertical pixel pitch 30 that is substantially less than 150 μm. As an example and not by way of limitation, for $PP_x \cong PP_y \cong 50$ μm, separation distance 70 is approximately 6×(50 μm), or 300 μm, and separation distance 72 is approximately $$\frac{13}{3} \times (50 \text{ μm}),$$

or 217 μm. In particular embodiments, a mesh pattern may include on the order of 1, 10, 100, 1,000, or any suitable number of conductive lines 50 and 52. Although this disclosure describes and illustrates particular mesh patterns that include particular numbers of conductive lines, This disclosure contemplates any suitable mesh pattern that includes any suitable number of conductive lines.

In particular embodiments, conductive lines 50 and 52 are substantially straight lines. In addition or as an alternative, in particular embodiments, non-linear conductive line patterns may be used to avoid long linear stretches of conductive metal with a repeat frequency, which may reduce the appearance of optical interference or moiré patterns. In particular embodiments, one or more segments of one or more conductive lines 50 and 52 may have a variation in line direction or path from a straight line, including but not limited to, wavy, sinusoidal, or zig-zag lines. As an example and not by way of limitation, one or more segments of one or more conductive lines 50 and 52 may be substantially sinusoidal. In particular embodiments, conductive lines 50 and 52 may have a sinusoidal variation with a peak-to-peak amplitude between 0 and 30 μm. Additionally, in particular embodiments, conductive lines 50 may have a sinusoidal variation with a period approximately equal to the separation distance between conductive lines 52 as measured along conductive lines 50. Similarly, in particular embodiments, conductive lines 52 may have a sinusoidal variation with a period approximately equal to the separation distance between conductive lines 50 as measured along conductive lines 52. In particular embodiments, conductive lines 50 and 52 that include segments that are non-linear may have line separation distances 70 and 72 that may be determined based on an average separation distance or based on a separation distance between linear approximations to non-linear line segments. Although this disclosure describes and illustrates particular meshes that have particular conductive lines 50 and 52 with particular curves (e.g., substantially straight or substantially sinusoidal), this disclosure contemplates any suitable meshes that have any suitable conductive lines with any suitable curves.

A mesh pattern represented by conductive lines 50 and 52 in the examples of FIGS. 4-8 may have a single-layer, dual-layer, or suitable multi-layer configuration. In particular embodiments, for a single-layer mesh pattern, conductive lines 50 and 52 in the examples of FIGS. 4-8 may be disposed on one side of a substrate. In particular embodiments, a dual-layer mesh pattern may have a first layer of conductive lines 50 and 52 disposed on one side of a single substrate and a second layer of conductive lines 50 and 52 disposed on another side of the substrate. As another example, a dual-layer mesh pattern may have a first layer of conductive lines 50 and 52 disposed on one side of one substrate and a second layer of conductive lines 50 and 52 disposed on one side of another substrate. In particular embodiments, conductive lines 50 and 52 of a mesh pattern may be alternately disposed on the first or second layers of a dual-layer mesh pattern. As an example and not by way of limitation, the example mesh pattern of FIG. 7 may have a dual-layer configuration with conductive lines 50A-1 and 52D-1 included in a first layer and conductive lines 50A-2 and 52D-2 included in a second layer.

This disclosure contemplates a touch sensor with any suitable number of layers of conductive lines 50 and 52. In such dual-layer (or multi-layer) touch-sensor configurations, one of the layers of conductive lines 50 and 52 may provide drive electrodes of the touch sensor and the other layer of conductive lines 50 and 52 may provide sense electrodes of the touch sensor. Moreover, in such dual-layer touch-sensor configurations, first layer of conductive lines 50 and 52 and second layer of conductive lines 50 and 52 may be offset from each other by a specific distance along a specific direction.

In particular embodiments, adjacent conductive lines 50 of the first layer may have a separation distance 70 along horizontal axis 28 that is substantially the same as a separation distance 70 along horizontal axis 28 of adjacent conductive lines 50 of the second layer. Similarly, in particular embodiments, adjacent conductive lines 52 of the first layer may have a separation distance 72 along horizontal axis 28 that is substantially the same as a separation distance 72 along horizontal axis 28 of adjacent conductive lines 52 of the second layer. In particular embodiments, a first layer of conductive lines 50 may be offset from a second layer of conductive lines 50 along horizontal axis 28 by a distance that is substantially equal to one-half the distance between conductive lines 50 of the first layer as measured along horizontal axis 28. Similarly, in particular embodiments, a first layer of conductive lines 52 may be offset from a second layer of conductive lines 52 along horizontal axis 28 by a distance that is substantially equal to one-half the distance between conductive lines 52 of the first layer as measured along horizontal axis 28.

As an example and not by way of limitation, adjacent conductive lines 50 of the first layer may be separated from each other along horizontal axis 28 by a separation distance 70 that is substantially equal to six times horizontal pixel pitch 26 (or 18 times HSPP 38), and adjacent conductive lines 50 of the second layer may have approximately the same spacing. Moreover, a first layer of conductive lines 50 may be offset from a second layer of conductive lines 50 by a distance along horizontal axis 28 that is substantially equal to three times horizontal pixel pitch 26 (or nine times HSPP 38). As another example and not by way of limitation, adjacent conductive lines 52 of the first layer may have a separation distance 72 along horizontal axis 28 that is substantially equal to $$\frac{13}{3}$$

times horizontal pixel pitch 26 (or 13 times HSPP 38), and adjacent conductive lines 52 of the second layer may have approximately the same spacing. Moreover, a first layer of conductive lines 52 may be offset from a second layer of conductive lines 52 by a distance along horizontal axis 28 that is substantially equal to $$\frac{13}{6}$$

times horizontal pixel pitch 26 (or 6.5 times HSPP 38). This disclosure similarly contemplates a touch sensor with any suitable number of layers of conductive lines 50 and 52 in the mesh design of any of FIGS. 4-8. Although this disclosure describes multi-layer touch sensors with particular offsets between conductive lines of different layers, this disclosure contemplates multi-layer touch sensors with any suitable offsets between conductive lines of different layers.

In particular embodiments, conductive lines 50 or conductive lines 52 of a dual-layer mesh pattern may have one or more portions disposed on a first layer and one or more portions disposed on a second layer of a dual-layer mesh pattern. In particular embodiments, a conductive line 50 or 52 may be separated into multiple distinct segments, where each segment is disposed on a first or second layer of a dual-layer mesh pattern. In particular embodiments, a conductive line 50 or 52 with multiple segments disposed on a first or second layer of a dual-layer mesh pattern may be viewed as a single, continuous line when seen from above a plane of the mesh pattern. As an example and not by way of limitation, a conductive line 50 may have three distinct portions: a first portion disposed on a first layer, a second portion disposed on a second layer, and a third portion disposed on a first layer. Although this disclosure describes and illustrates mesh patterns having particular conductive lines with particular portions disposed on one or more surfaces, this disclosure contemplates any suitable mesh patterns having any suitable conductive lines with any suitable portions disposed on any suitable number of surfaces.

In particular embodiments, a mesh pattern overlaid over a repeating pixel pattern of a display may result in one or more moiré patterns, where a moiré pattern refers to a waviness or a spatial variation in optical intensity of a display. A moiré pattern may result from the repeating pattern of conductive lines 50 and 52 being superimposed onto the repeating pattern of pixels of a display. In particular embodiments, conductive lines 50 and 52 may occlude light originating from pixels of a display situated below a mesh pattern, and the pattern of occlusion associated with conductive lines 50 and 52 may result in one or more moiré patterns that may be visible by a user. In particular embodiments, the mesh patterns described herein or illustrated by FIGS. 4-8 may reduce the occurrence of repeating patterns or frequencies between conductive lines 50 and 52 and pixels of a display, which may in turn reduce the amplitude or intensity of one or more moiré patterns associated with the mesh pattern and a display. As an example and not by way of limitation, a mesh pattern characterized by angles 54 and 56 and line spacings 70 and 72, as described above, may result in a reduction of the amount of intensity variation associated with a moiré pattern.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
a touch sensor comprising a mesh of conductive material, wherein:
the mesh comprises a plurality of first lines and a plurality of second lines of conductive material extending across a display, the first lines being substantially parallel to each other, the second lines being substantially parallel to each other, the display comprising a plurality of pixels, each of the pixels having a first pixel pitch ($PP_x$) along a first axis and a second pixel pitch ($PP_y$) along a second axis that is perpendicular to the first axis, the first pixel pitch being equal to a distance between corresponding features of two adjacent pixels along the first axis, the second pixel pitch being equal to a distance between corresponding features of two adjacent pixels along the second axis;
the first lines extend across the display at a first angle relative to the first axis;
the second lines extend across the display at a second angle relative to the first axis;
first lines that are adjacent to each other are separated from each other along the first axis by a first-line separation distance that is within 3% of $k \times 3 \times PP_x$, wherein k is a positive integer; and
second lines that are adjacent to each other are separated from each other along the first axis by a second-line separation distance that is within 3% of $$k \times \frac{13}{6} \times PP_x;$$

and
one or more computer-readable non-transitory storage media coupled to the touch sensor and embodying logic that is configured when executed to control the touch sensor.

2. The apparatus of claim 1, wherein:
k is equal to 1;
the first-line separation distance is within 3% of $3 \times PP_x$; and
the second-line separation distance is within 3% of $$\frac{13}{6} \times PP_x.$$

3. The apparatus of claim 1, wherein:
k is equal to 2;
the first-line separation distance is within 3% of $6 \times PP_x$; and
the second-line separation distance is within $$3\% \text{ of } \frac{13}{3} \times PP_x.$$

4. The apparatus of claim 1, wherein:
the first angle is within 1° of the arctangent of $$\left[ \frac{3}{m} \times \frac{PP_y}{PP_x} \right],$$

wherein m is equal to 1, 2, 4, or 5; and
the second angle is within 1° of the arctangent of $$\left[ \frac{3}{n} \times \frac{PP_y}{PP_x} \right],$$

wherein n is equal to 1, 2, 4, or 5.

5. The apparatus of claim 4, wherein:
m is different from n; and
the first angle is different from the second angle.

6. The apparatus of claim 4, wherein:
m is equal to n; and
the first angle and the second angle are approximately equal.

7. The apparatus of claim 4, wherein:
the first pixel pitch is approximately equal to the second pixel pitch;
the first angle is within 1° of 30.96°, 36.87°, 56.31°, or 71.57°; and
the second angle is within 1° of 30.96°, 36.87°, 56.31°, or 71.57°.

8. The apparatus of claim 1, wherein:
the first angle is oriented counterclockwise relative to the first axis; and
the second angle is oriented clockwise relative to the first axis.

9. The apparatus of claim 1, wherein:
the first axis is horizontal;
the second axis is vertical;
the first pixel pitch along the first axis is a pixel width; and
the second pixel pitch along the second axis is a pixel height.

10. The apparatus of claim 1, wherein the sub-pixels are substantially rectangular.

11. The apparatus of claim 1, wherein one or more segments of one or more of the first or second lines are substantially sinusoidal.

12. A touch sensor comprising:
a mesh of conductive material, wherein:
the mesh comprises a plurality of first lines and a plurality of second lines of conductive material extending across a display, the first lines being substantially parallel to each other, the second lines being substantially parallel to each other, the display comprising a plurality of pixels, each of the pixels having a first pixel pitch ($PP_x$) along a first axis and a second pixel pitch ($PP_y$) along a second axis that is perpendicular to the first axis, the first pixel pitch being equal to a distance between corresponding features of two adjacent pixels along the first axis, the second pixel pitch being equal to a distance between corresponding features of two adjacent pixels along the second axis;
the first lines extend across the display at a first angle relative to the first axis;
the second lines extend across the display at a second angle relative to the first axis;
first lines that are adjacent to each other are separated from each other along the first axis by a first-line separation distance that is within 3% of $k \times 3 \times PP_x$, wherein k is a positive integer; and
second lines that are adjacent to each other are separated from each other along the first axis by a second-line separation distance that is within $$3\% \text{ of } k \times \frac{13}{6} \times PP_x.$$

13. The touch sensor of claim 12, wherein:
k is equal to 1;
the first-line separation distance is within 3% of $3 \times PP_x$; and
the second-line separation distance is within $$3\% \text{ of } \frac{13}{6} \times PP_x.$$

14. The touch sensor of claim 12, wherein:
k is equal to 2;
the first-line separation distance is within 3% of $6 \times PP_x$; and
the second-line separation distance is within $$3\% \text{ of } \frac{13}{3} \times PP_x.$$

15. The touch sensor of claim 12, wherein:
the first angle is within 1° of the arctangent of $$\left[\frac{3}{m} \times \frac{PP_y}{PP_x}\right],$$

wherein m is equal to 1, 2, 4, or 5; and
the second angle is within 1° of the arctangent of $$\left[\frac{3}{n} \times \frac{PP_y}{PP_x}\right],$$

wherein n is equal to 1, 2, 4, or 5.

16. The touch sensor of claim 15, wherein:
m is different from n; and
the first angle is different from the second angle.

17. The touch sensor of claim 15, wherein:
m is equal to n; and
the first angle and the second angle are approximately equal.

18. The touch sensor of claim 15, wherein:
the first pixel pitch is approximately equal to the second pixel pitch;
the first angle is within 1° of 30.96°, 36.87°, 56.31°, or 71.57°; and
the second angle is within 1° of 30.96°, 36.87°, 56.31°, or 71.57°.

19. The touch sensor of claim 12, wherein:
the first angle is oriented counterclockwise relative to the first axis; and
the second angle is oriented clockwise relative to the first axis.

20. The touch sensor of claim 12, wherein:
the first axis is horizontal;
the second axis is vertical;
the first pixel pitch along the first axis is a pixel width; and
the second pixel pitch along the second axis is a pixel height.

* * * * *